United States Patent
Kandukuri

(10) Patent No.: US 12,030,601 B2
(45) Date of Patent: Jul. 9, 2024

(54) UNDERWATER DEVICE FOR ACQUIRING IMAGES OF THE BED OF A BODY OF WATER

(71) Applicant: PLANBLUE GMBH, Bremen (DE)

(72) Inventor: Raja Kandukuri, Bremen (DE)

(73) Assignee: PLANBLUE GMBH, Bremen (DE)

( * ) Notice: Subject to any disclaimer, the term of this patent is extended or adjusted under 35 U.S.C. 154(b) by 309 days.

(21) Appl. No.: 17/614,028

(22) PCT Filed: May 12, 2020

(86) PCT No.: PCT/EP2020/063180
§ 371 (c)(1),
(2) Date: Nov. 24, 2021

(87) PCT Pub. No.: WO2020/239433
PCT Pub. Date: Dec. 3, 2020

(65) Prior Publication Data
US 2022/0250725 A1    Aug. 11, 2022

(30) Foreign Application Priority Data
May 28, 2019   (LU) ........................................ 101239

(51) Int. Cl.
| | |
|---|---|
| *B63B 79/15* | (2020.01) |
| *B63B 79/40* | (2020.01) |
| *B63C 11/52* | (2006.01) |
| *B63G 8/00* | (2006.01) |
| *B63G 8/38* | (2006.01) |

(Continued)

(52) U.S. Cl.
CPC .............. *B63B 79/15* (2020.01); *B63B 79/40* (2020.01); *B63C 11/52* (2013.01); *B63G 8/001* (2013.01); *B63G 8/38* (2013.01); *G01C 21/3807* (2020.08); *G01C 21/3837* (2020.08); *H02J 3/14* (2013.01); *B63G 2008/004* (2013.01)

(58) Field of Classification Search
CPC ......... B63B 79/15; B63B 79/40; B63C 11/52; B63G 8/001; B63G 8/38; B63G 2008/004; G01C 21/3807; G01C 21/3837; H02J 3/14; H02J 2310/42; H02J 7/0031; H02J 9/06; H02H 5/04; H02H 5/083
USPC ............................................................ 701/28
See application file for complete search history.

(56) References Cited

FOREIGN PATENT DOCUMENTS

| | | | |
|---|---|---|---|
| CN | 202068171 U | | 12/2011 |
| CN | 202350833 | * | 7/2012 |

(Continued)

OTHER PUBLICATIONS

Arjun Chennu et al., "A diver-operated hyperspectral imaging and topographic surveying system for automated mapping of benthic habitats", Scientific Reports, vol. 7, No. 1, Aug. 2, 2017.

*Primary Examiner* — Muhammad Shafi
(74) *Attorney, Agent, or Firm* — Hodgson Russ LLP

(57) ABSTRACT

The invention relates to an underwater device for capturing images of a seabed, comprising at least one sensor for detecting a sensor value, at least one electrical consumer and an electrical energy source for supplying electrical energy to the electrical consumer. The underwater device is characterised in that, based on the sensor value, it is determined whether a hazardous condition exists for the electrical consumer and an energy distribution unit is provided which disconnects the electrical consumer from the electrical energy source if a hazardous condition exists.

20 Claims, 4 Drawing Sheets

Figure 1:
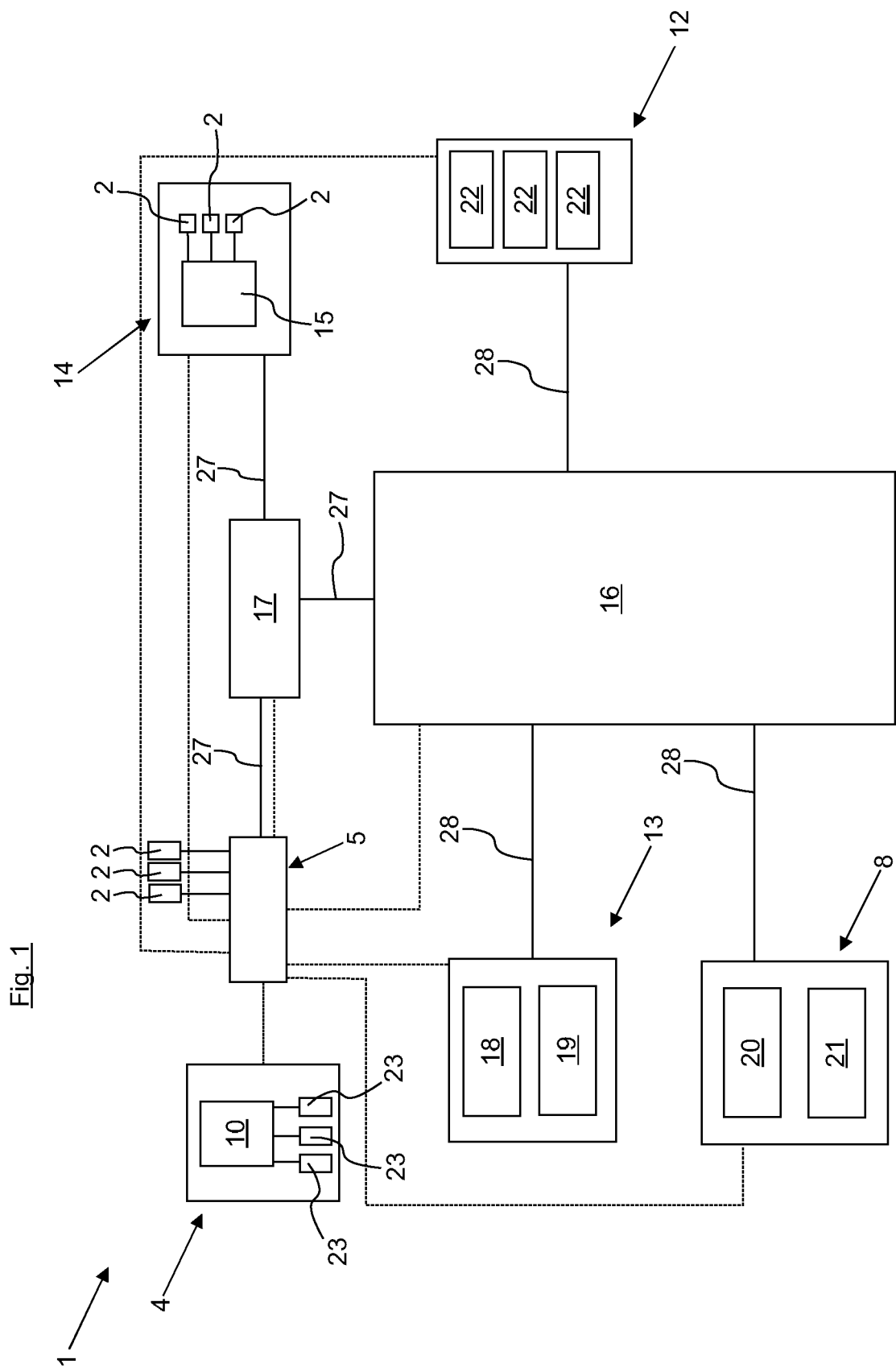

(51) Int. Cl.
    *G01C 21/00*    (2006.01)
    *H02J 3/14*    (2006.01)

(56) References Cited

FOREIGN PATENT DOCUMENTS

| CN | 208021694 | * | 10/2018 |
|----|-----------|---|---------|
| JP | 2018203192 | * | 12/2018 |
| KR | 20120068330 | * | 6/2012 |
| KR | 20120068330 A | | 6/2012 |
| KR | 20150144517 | * | 12/2015 |
| KR | 20150144517 A | | 12/2015 |

* cited by examiner

UNDERWATER DEVICE FOR ACQUIRING IMAGES OF THE BED OF A BODY OF WATER

The invention relates to an underwater device for capturing images of a seabed, comprising at least one sensor for detecting a sensor value, at least one electrical consumer and an electrical energy source for supplying electrical energy to the electrical consumer. The invention also relates to a method of operating such an underwater device.

There exists a need to monitor marine and freshwater ecosystems from both an economic and ecological perspective. One challenge in monitoring ecosystems is that, on the one hand, a fine spatial resolution of the seabed is needed to capture the high diversity of organisms with sufficient accuracy and, on the other hand, a large area must be examined.

Underwater devices are known from the prior art which have a camera and by means of which images of the seabed are captured. However, with the known underwater devices, the problem often arises that they are damaged during operation. For example, underwater devices have a large number of electronic components that are sensitive to water and/or high humidity. During operation, however, it cannot be ruled out that, for example, due to leaks, water may enter the interior of the underwater device and thus come into contact with the electronic components or that the humidity inside the underwater device may increase. In this case, the underwater device will be damaged and/or can no longer be used.

The object of the invention is therefore to provide an underwater device in which the risk of damage to the electrical consumers during operation of the underwater device is reduced.

The object is achieved by an underwater device of the type mentioned at the outset, which is characterised in that, based on the sensor value, it is determined whether there is a hazardous condition for the electrical consumer, and an energy distribution unit is present which disconnects the electrical consumer from the electrical energy source if there is a hazardous condition.

KR 2015 0144517 A discloses a cable-guided underwater device. The cable-guided underwater device is controlled from a ship by means of a cable. The current or the magnetic field in a coupling device is determined in order to assess whether a fault is present. The coupling device is connected to the cable and is located on the ship.

KR 2012 0068330 A discloses a cable-guided underwater vehicle connected to a ship by means of a cable. The underwater vehicle has a monitoring unit by means of which the status of the external energy supply is monitored. If a fault condition is detected, the energy supply is switched from the external energy supply via the cable to an internal energy supply via the battery module.

Arjun Chennu Et Al "A diver operated hyperspectral imaging and topographicsurveying system for automated mapping of benthic habitats", Scientific Reports, Bd. 7, No. 1, 2 Aug. 2017 (2017-08-02), XP055660413, DOI: 10.1038/s41598-017-07337-y discloses an underwater device by means of which images were captured of a seabed. For this purpose, the underwater device has, among other things, a hyperspectral camera, sensors and a computer.

It is also an object of the invention to provide a method for operating an underwater device in which the risk of damage to the electrical consumers during operation of the underwater device is reduced.

The object is achieved by a method for the operation of an underwater device, in which a sensor value is detected by at least one sensor of the underwater device and, based on the detected sensor value, it is determined whether a hazardous condition exists for an electrical consumer of the underwater device, and an electrical connection between the electrical consumer and an electrical energy source of the underwater device is disconnected by the energy distribution unit if a hazardous condition exists.

The underwater device according to the invention has the advantage of actively checking whether a hazardous condition exists in which an electrical consumer can be damaged. In the event that it is determined that a hazardous condition exists, damage to the electrical consumer can be prevented by the energy distribution unit disconnecting the electrical connection between the electrical energy source and the electrical consumer. In this way, the risk of the electrical consumer being damaged if water enters a cavity of the underwater device in which the electrical consumers are located, for example due to leakage, and/or if the humidity in the cavity is too high, is reduced.

In operation, the underwater device can be arranged partially or completely in the water. For the examination of a seabed in great depths, the underwater device can be completely immersed in the water. The underwater device can be used to study marine and freshwater ecosystems.

Electrical consumers are components of the underwater device that have electronic components and can therefore be damaged if they come into contact with water and/or the humidity of the air surrounding them is too high.

In a particular embodiment, the energy distribution unit can have a control device. The control device can have a processor and/or evaluate the acquired sensor value. In particular, the control device can determine whether a hazardous condition exists based on the acquired sensor value. In this case, the control device can cause the electrical energy source to be disconnected from the electrical consumer. In this regard, no electrical energy can be supplied to the electrical consumer if a hazardous condition exists. This is a simple way to prevent the electrical consumer from being damaged. The energy distribution unit is used to distribute the electrical energy provided by the electrical energy source to the electrical consumers of the underwater device. Accordingly, the energy distribution unit enables the electrical consumer to be supplied with electrical energy.

The energy distribution unit can have a switching device by means of which the electrical connection between the electrical energy source and the electrical consumer can be disconnected. The switching device can have a number of switches by means of which the electrical consumers can be disconnected from the electrical energy source separately and/or independently of one another. As a result, the electrical connection between the electrical energy source and the electrical consumer can be easily disconnected at the command of the control device of the energy distribution unit. In particular, the control device of the energy distribution unit can set a switch position of the switch accordingly to establish or disconnect an electrical connection between the electrical energy source and the electrical consumer. The number of switches can correspond to the number of electrical consumers.

In a particular embodiment, the energy distribution unit can generate a switch-off message and the switch-off message can be transmitted to the electrical consumer prior to a disconnection of the electrical connection between the electrical energy source and the electrical consumer. This prevents the electrical consumer from being switched off abruptly. The electrical consumer thus still has time to take precautions, for example, to avoid a loss of data. Thus, after receiving the switch-off message, the electrical consumer can cause the processing to be stopped and any intermediate results to be saved.

It is advantageous if the energy distribution unit waits for a predetermined period of time after the switch-off message has been transmitted before the electrical connection between the electrical energy source and the electrical consumer is disconnected. As previously explained, the electrical consumer can thus be given time to complete the processing operation and/or to store any intermediate results.

Alternatively or additionally, the energy distribution unit can wait for feedback from the electrical consumer after transmitting the switch-off message before disconnecting the electrical connection between the electrical energy source and the electrical consumer. In this case, it is ensured that the processing operation is completed and/or any intermediate results are stored because the electrical connection between the electrical energy source and the electrical consumer is not disconnected until the feedback information has been received.

Alternatively or additionally, the energy distribution unit can wait, after transmitting the switch-off message, until a current through the electrical consumer has fallen below or exceeded a predefined threshold value before the electrical connection between the electrical energy source and the electrical consumer is disconnected. By examining the current, the energy distribution unit, in particular the control device of the energy distribution unit, can determine whether processing operations are still taking place in the electrical consumer. Therefore, it is ensured that the electrical consumer is not disconnected from the electrical energy source until the electrical consumer has completed all processing operations.

The energy distribution unit, in particular the control device of the energy distribution unit, can examine the acquired sensor value to determine whether a hazardous condition exists. In this respect, the energy distribution unit, in particular the control device of the energy distribution unit, can determine a hazardous condition if the acquired sensor value deviates from a predefined or predefinable limit value or lies outside a limit range. In particular, the acquired sensor value may be above a limit value and/or outside a limit range when the hazardous condition exists. The sensor value can be acquired by at least one sensor connected to the energy distribution unit. The sensor can be directly connected to the control device.

In this regard, the control device of the energy distribution unit can generate an alarm message if a hazardous condition exists. The alarm message can be queued and, as described in more detail below, processed as part of a processing operation by the energy distribution unit, in particular the control device of the energy distribution unit.

It is particularly easy to determine a hazardous condition if the current supplied to the electrical consumer or the voltage applied to the electrical energy source or to the electrical consumer is determined by means of the sensor. The control device of the energy distribution unit can infer whether a hazardous condition exists by examining the current and/or voltage.

In this regard, the energy distribution unit, in particular the control device of the energy distribution unit, can cause current values to be acquired for a predetermined first and a predetermined second time period, respectively. In this regard, the second time period is longer than the first time period. To determine whether the electrical consumer should be disconnected from the electrical energy source, the current values acquired during the first time period can be used.

Using the current values recorded during the first time period offers the advantage that deviations can be detected more quickly and thus a hazardous condition can be inferred more quickly than if the current values recorded during the second time period are used. In contrast, the current values recorded during the second time period are more suitable for evaluation than the current values recorded during the first time period.

The underwater device can have a sensor unit comprising at least one sensor and a sensor control device. The sensor control device determines that a hazardous condition exists if the detected sensor value deviates from a predefined or predefinable limit value or lies outside a limit range. In particular, the acquired sensor value may be above the limit value and/or outside the limit range when the hazardous condition exists. As a result, the determination of whether a hazardous condition exists can be made by the sensor control device, thereby relieving the energy distribution unit. The sensor control device can be a processor.

The information that a hazardous condition exists can be transmitted from the sensor control device to the energy distribution unit, in particular the control device of the energy distribution unit. In doing so, the sensor control device can generate an alarm message that is transmitted to the energy distribution unit.

It is particularly advantageous if a communication protocol for communication between the energy distribution unit and an electrical consumer, in particular a control device of the underwater device, has a publish/subscribe mechanism. The message to be transmitted can be published in a data channel. In addition, the message can be received from the data channel.

The control device of the underwater device can have receiving means for receiving the messages transmitted by the energy distribution unit. The publish/subscribe mechanism offers the advantage that the energy distribution unit and the electrical consumer do not need to be assigned fixed addresses, in particular IP addresses, in the network of the underwater device and/or that the communication partners do not need to know the address, in particular IP address, of the other communication partner in order to communicate with one another. The network can be an Ethernet network. the communication protocol used for data communication can comprise the Message Queue Telemetry Transport Protocol (MQTT).

A control centre can be provided that manages the messages published in the at least one data channel. The control centre can be designed to transmit the messages published in the data channel to at least one receiving means subscribed to the data channel. In this regard, a control device of the underwater device can have the control centre.

The sensor control device can be designed in such a way that it publishes an alarm message in a data channel if a hazardous condition is present. The energy distribution unit is designed to receive the alarm message from the data channel and then disconnect the electrical connection between the electrical consumer and the electrical energy source. To receive the alarm message, the energy distribution unit can have the aforementioned receiving means.

Such a method offers the advantage that, from the point of view of the energy distribution unit, it is only relevant whether an alarm message is published in the data channel. In contrast, it is irrelevant for the energy distribution unit who published the alarm message in the data channel. Thus, components of the underwater device other than the sensor control device can also publish alarm messages in the data channel without this making any difference for the operation of the energy distribution unit. Accordingly, the sensor control device can be replaced and/or additional sensors can be added without requiring any changes to the energy distribution unit. This simplifies the operation of the underwater device in a considerable manner.

The previously described switch-off message can be transmitted in the same way as the alarm message. Thus, the control device of the energy distribution unit can publish the switch-off message in another data channel. A receiving means of the electrical consumer subscribed to the data channel receives the switch-off message.

In a particular embodiment, the underwater device can have an electrical display device. The electrical display device can have a screen display and offers the advantage that an operating state of the underwater device and/or captured images of the seabed can be easily visually displayed to the diver.

Furthermore, the underwater device can have a control unit that is electrically connected to the energy distribution unit. Using the control unit, the user, in particular the diver, can enter commands for the underwater device. Thus, by operating the control unit, the energy distribution unit can cause the electrical connection between the electrical consumer and the electrical energy source to be established or disconnected, or the electrical consumer and/or the electrical display device to be switched to a sleep mode, or the electrical consumer and/or the electrical display device to be switched to an energy saving mode. The user, in particular the diver, can select the desired operating state from the aforementioned operating states of the underwater device by actuating the control unit for different lengths of time.

In sleep mode, the electrical consumers are not shut down, but are transferred to a state in which they require little electrical energy. In sleep mode, the electrical consumers are transferred to a mode in which they cannot perform their technical function, but the electrical consumers are not switched off. In this mode, the electrical consumers can be transferred from sleep mode to functional mode more quickly than from the switched-off state. Sleep mode is useful when the capture of images of the seabed using the underwater device is not required and, for example, the underwater device is to be transferred from one position to another. As a result, the operating time of the underwater device can be extended due to the energy savings when operating in sleep mode. In the energy saving mode, the electrical energy consumption of the electrical consumer and/or the electrical display device is reduced. In this regard, the brightness of the electrical display device can be reduced in energy saving mode. As a result, the operating time of the underwater device can be extended due to the energy savings when operating in energy saving mode.

The control unit can be integrated into the display device. In particular, the control unit can have control buttons that are arranged on a housing of the display device. The user, in particular the diver, can thus enter the commands directly via the control buttons. This is advantageous because it is difficult to enter commands under water and therefore simple input options are needed.

When a hazardous condition is detected, the energy distribution unit cannot electrically disconnect the display device from the electrical energy source. This offers the advantage that the hazardous condition can be immediately indicated to the user, in particular the diver. In addition, recommendations for the next steps, such as surfacing, can be given to the user, in particular the diver, via the display device to prevent damage to the electrical consumers of the underwater device. Alternatively, it is possible for the energy distribution unit to disconnect the display device from the electrical energy source when a hazardous condition exists.

The sensor can be used to detect a temperature or a humidity or a pressure inside a cavity of the underwater device. If the underwater device has several sensors, the sensors can be used to determine the temperature and/or humidity and/or pressure inside the cavity of the underwater device. In addition, a sensor can be present by means of which the current in the electrical consumer and/or the voltage applied to the electrical consumer is detected, as described previously. The sensor or sensors can be directly electrically connected to the control device of the underwater device. The sensor value can be determined by at least one sensor of the sensor unit of the underwater device and/or at least one sensor of the energy distribution unit.

In a particular embodiment, the underwater device can have a lighting device, in particular an LED display, for indicating the operating state of the underwater device. The lighting device can have at least one lighting means, in particular an LED. The lighting device is advantageous because visibility underwater is often poor, so the diver can be easily informed of the operating state of the underwater device by the lighting device. In this manner, the operating state can be easily indicated by different colour schemes of the LED and/or brightness and/or by flashing.

The electrical energy source can have a plurality of batteries and/or be of modular design. The modular formation has the advantage that the energy source can be easily replaced. In this case, the energy source can be connected to a housing of the underwater device in a releasable manner. In particular, the energy source can be mounted on and/or in the housing. The connection can be mechanical and/or electrical. The energy source can be connected directly to the housing in a form-fitting and/or force-fitting manner. In particular, it can thus be prevented in an advantageous manner that the electrical consumers of the underwater device are supplied with electrical energy via a power cable going from the underwater device to, for example, a ship. As a result, the integrated arrangement of the energy source on and/or in the housing enables easy maneuverability of the underwater device and/or the underwater device is designed to be compact.

The electrical energy source can have a battery control device for monitoring the battery condition. This makes it easy to identify defective batteries. In addition, the electrical energy source can have means for cooling the battery control device and/or battery sensors. The battery temperature can be measured using the battery sensors.

The electrical consumer can be the sensor control device of the underwater device. In addition, the electrical consumer can be another control device located outside the energy distribution unit. In addition, the electrical consumer can be an electrical component of another component of the underwater device. For example, the underwater device can have a position determination unit for determining the actual position of the underwater device. The position determination unit can have at least one electrical consumer. In particular, the electrical consumers can be positioning means of the position determination unit required for position determination.

In addition, the underwater device can have an image capture unit for capturing images of the seabed. The image capture unit can have at least one electrical consumer. The image capture unit can have a hyperspectral camera. Furthermore, the image capture unit can have a colour camera, in particular an RGB camera. Both the colour camera and the hyperspectral camera capture images of the seabed.

A hyperspectral camera is a camera that captures multispectral data in very narrow spectral bands of visible light, near infrared and mid infrared. Hyperspectral cameras thus allow high spectral resolution of object-specific signatures in more than 15, but generally in 30-200 contiguous channels, enabling documentation of a nearly continuous spectrum for each image element.

The colour camera, especially RGB camera, is not a hyperspectral camera. The colour camera differs from the hyperspectral camera in that it has fewer channels than the hyperspectral camera, in particular exactly three channels. Accordingly, with a colour camera, the viewed object cannot be spectrally resolved as high as with a hyperspectral camera.

The underwater device can map the seabed based on the images captured. Compared to previous underwater devices, the use of the underwater device according to the invention enables a very precise examination of the seabed.

In a particular embodiment, the underwater device can be designed such that it is manually controllable and/or operable and/or portable. This means that the underwater device is not controlled remotely by a ship, but solely by the diver. The underwater device can be designed without a propeller. This means that the underwater device is propelled solely by the diver. The underwater device thus does not have a drive motor to drive the underwater device.

The underwater device can have a housing enclosing a cavity, wherein the electrical consumer and the energy distribution unit are arranged within the cavity. Thus, the position determination unit can be at least partially arranged in the cavity. At least one sensor of the position determination unit can be located outside the cavity. The image capture unit, in particular the hyperspectral camera and/or the colour camera, can be arranged, in particular completely, within the cavity.

The energy distribution unit can perform different tasks. The individual tasks can be prioritised differently. This means that the energy distribution unit processes the tasks with higher prioritisation faster than tasks with lower prioritisation. By prioritising accordingly, it can thus be ensured that alarm messages are processed quickly by the energy distribution unit.

The energy distribution unit can optionally perform a communication task or a current monitoring task or an energy control task for controlling the operating state of the underwater device or a processing task for processing messages, in particular or an indication task. The individual tasks are described in more detail below.

Performing the communication task enables the components, such as electrical consumers, of the underwater device to communicate with each other or with external devices in a data-transmitting manner. In particular, performing the communication task can enable the energy distribution unit to communicate with the electrical consumer in a data-transmitting manner. In doing so, upon receipt of a message, the energy distribution unit can respond to the message immediately, such as a request for the time of day, or the energy distribution unit can queue the message for processing when performing the processing task described below.

The energy distribution unit communicates with the electrical consumer by publishing a message in a data channel, as described above. This means that the message is available to the receiving means or all receiving means subscribed to the data channel. Thus, the energy distribution unit can receive the message when a receiving means of the energy distribution unit subscribes to the data channel. The receiving means can only receive messages from data channels to which they have subscribed.

Thus, the image capture unit can transmit a message into another data channel to indicate that an image capture process is to take place. The control device, in particular the receiving means of the control device, of the energy distribution unit receives the message and causes an illumination of the underwater device to be turned off to prevent the illumination light from being acquired by the image capture unit.

In addition, control messages can be transmitted to the energy distribution unit when the communication task is carried out. In this way, a control message can be transmitted that an image capture process is to take place. The energy distribution unit causes the electrical connection between the electrical consumer, in particular the electrical consumer of the image capture unit, and the energy source to be closed. This makes it easy to ensure that only those electrical consumers that are actually needed are electrically connected to the energy source.

When performing the current monitoring task, the energy distribution unit can determine current values for a predetermined first time period and for a predetermined second time period, as described above. In this case, based on the current values determined in the first time period, it is determined whether a hazardous condition exists. In addition, when the current monitoring task is carried out, it is checked whether the respective electrical consumer is switched on or off by determining the current. Also, when performing the current monitoring task, it can be determined if there is a short circuit. This is the case when a current value is detected that is above a predefined threshold.

When performing the energy control task, the operating state of the underwater device is set. This is done by monitoring whether a control unit is actuated. As a result of the actuation, the electrical connection between the electrical consumer and the electrical energy source can be established in a switch-on mode or disconnected in a switch-off mode or the electrical consumer and/or the electrical display device can be transferred to the sleep mode or the electrical consumer and/or the electrical display device can be transferred to the energy saving mode.

When the processing task is carried out, the messages in the queue can be processed. A distinction can be made between alarm messages and action messages.

Alarm messages are messages that signal a hazardous condition so that the electrical connection between the electrical energy source and the electrical consumer should be disconnected by means of the energy distribution unit. Action messages contain information for the receiver about what action will be taken, such as switching off the receiver. The recipient can take further steps based on this information, such as storing data.

In the event that the sensor control device determines that the humidity in the cavity detected by the sensor is above the limit, an alarm message is published in the data channel. The receiving means of the control device of the energy distribution unit receives the alarm message and places it in the queue. In the processing mode of the energy distribution unit, the alarm message is processed. During processing, the electrical consumer is disconnected from the electrical energy source and the hazardous condition can be displayed on the electrical display device.

In the event that the sensor control device determines that the pressure in the cavity detected by the sensor rises above a predetermined limit, for example, it is assumed that a leak exists and an alarm message is output to the data channel. After receiving the alarm message and placing it in the queue, it is processed by the energy distribution unit.

This causes the electrical consumers to be disconnected from the energy source and it can be indicated to the diver to stop diving deeper to prevent more water from entering the cavity of the underwater device.

When executing the processing task, alarm messages generated by the control device of the energy distribution unit can also be processed. These alarms can be generated when it is determined that a hazardous condition exists based on the detected current values.

When performing the signalling task, the status of a lighting means can be checked. In this regard, it is possible to set whether at least one lighting means is illuminated or not when carrying out the signalling operation. The setting of the lighting condition of the lighting means can be dependent on the operating state of the underwater device and/or the presence of a hazardous condition.

Of particular advantage is an underwater device that is a diver-operated underwater device. Diver-operated underwater device means a device that can be operated by a diver in or under water. This means that the diver can move the underwater device in or under the water and thus move it to the desired position to capture images of the desired area of the seabed. In addition, the diver can operate the underwater device in or under water, in particular enter corresponding commands to capture images of the seabed.

Alternatively, the underwater device can be an autonomous underwater vehicle. With this design, the underwater device no longer needs to be moved by the diver to capture images of the seabed. The underwater vehicle can be controlled autonomously.

Furthermore, the underwater device can be a cable-guided underwater vehicle (remotely operated vehicle). With this design, the underwater device no longer needs to be moved by the diver to capture images of the seabed. The underwater vehicle can be controlled by a person on a ship.

Figure 2:
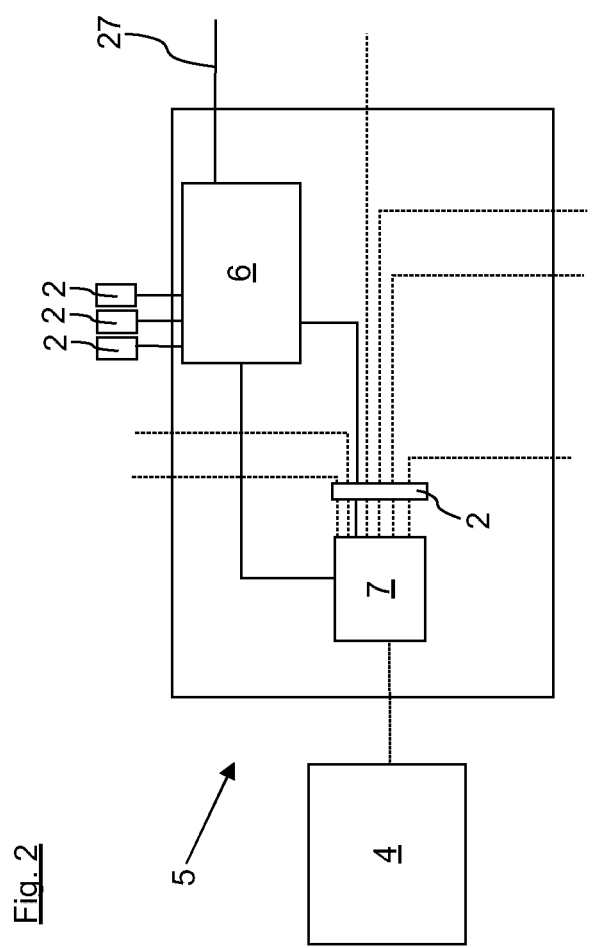
Figure 3:
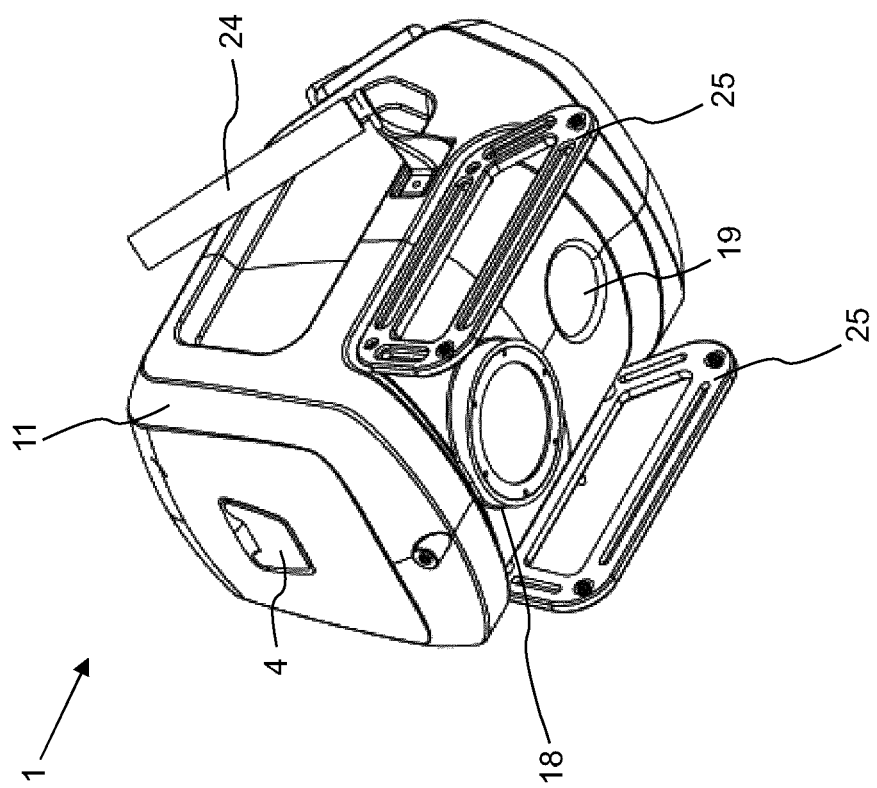
Figure 4:
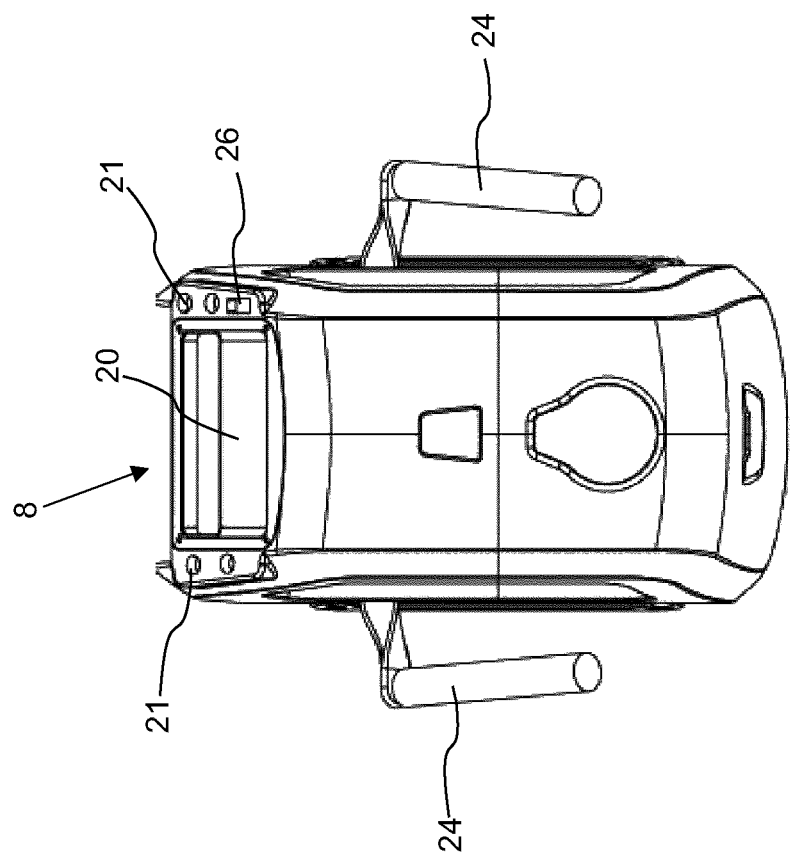

The subject matter of the invention is shown schematically in the figures, wherein elements that are the same or have the same effect are mostly provided with the same reference symbols. In the figures:

FIG. 1 shows the design of an underwater device according to the invention with an energy distribution unit and electrical consumers, FIG. 2 shows the design of an energy distribution unit, FIG. 3 shows a perspective view of the underwater device, FIG. 4 shows a top view of the underwater device.

The underwater device 1 shown in FIG. 1 for capturing images of a seabed is a diver-operated underwater device, as can be seen in FIGS. 3 and 4. The underwater device 1 can alternatively be an autonomous underwater vehicle or a cable-guided underwater vehicle.

The underwater device 1 has a sensor unit 14 which has a plurality of sensors 2 for detecting a sensor value in each case and an electrical consumer in the form of a sensor control device 15. By means of the sensors 2 of the sensor unit 14, the pressure, the temperature and/or the humidity can be measured. In addition, the underwater device 1 has further electrical consumers described in more detail below and an electrical energy source 4. The electrical energy source 4 is used to supply electrical consumers with electrical energy. In the underwater device 1, at least one sensor value is used to determine whether a hazardous condition exists for the electrical consumers.

The underwater device 1 also has an energy distribution unit 5 by means of which the electrical energy provided by the energy source 4 is distributed to the electrical consumers. Furthermore, the energy distribution unit 5 electrically disconnects the electrical consumer from the electrical energy source 4 when a hazardous condition exists. In particular, the energy distribution unit 5 ensures that no electrical energy is supplied to the electrical consumer when a hazardous condition has been detected. As can be seen in particular from FIG. 2, the energy distribution unit 5 has a control device 6 which causes the electrical connection between the energy source 4 and at least one electrical consumer to be disconnected if a hazardous condition is present. The control device 6 can have a processor.

The energy distribution unit 5 is directly connected to several sensors 2. By means of the sensors 2, the pressure, the temperature and/or the humidity can be measured. In particular, as can be seen in FIG. 2, the control device 6 of the energy distribution unit 5 is directly connected to the sensors 2. The sensor values detected by the sensors 2 are evaluated by the control device 6 to determine whether a hazardous condition exists. If a hazardous condition exists, an alarm message is generated by the control device 6 and placed in a queue. The alarm message is processed when a processing task is carried out by the control device 6. In this regard, the control device 6 causes the electrical connection between the energy source 4 and at least one electrical consumer to be disconnected.

The underwater device 1 further has an image capture unit 13 for capturing images of the seabed, a position determination unit 12 for determining the position of the underwater device 1, and an display device 8. Furthermore, the underwater device 1 has another control device 16 which is connected in a data-transmitting manner to the image capture unit 13, the position determination unit 12 and the display device. The connection can be made by means of a data line, such as a USB line 28. The underwater device 1 further has a switch 17 which is connected in a data-transmitting manner to the sensor unit 14, the energy distribution unit 5 and the further control device 16. The switch 17 is connected to the aforementioned components by a data bus 27.

The further control device 16 can have a processor. Furthermore, the further control device 16 can communicate wirelessly, for example via WLAN, with communication devices not shown in the figures. The communication devices are located outside the underwater device 1, for example on a ship.

The image capture unit 13 has a hyperspectral camera 18 and an RGB camera 19 by means of which images are captured of the seabed. The two cameras are controlled by means of a computer program executed on the further control device 16. In addition, the computer program processes, compresses and stores the captured images. The image capture unit 13 can access the sensor values provided by the sensor unit 14 to adjust the exposure, focus distance and capture speed. Both the hyperspectral camera 18 and the RGB camera 19 can each have a liquid lens. The further control device 16 can be used for the aforementioned processing of the images captured by the hyperspectral camera 18 and the images captured by the RGB camera 19.

The display device 8 has a screen display 20. In addition, the display device 8 has a control unit in the form of control buttons 21 which are attached to a screen housing, as can be seen in FIG. 4. In this regard, some functions of the underwater device 1 can be adjusted by means of the control buttons 21. The display device 8 is connected to the further control device 16 in a data-transmitting manner.

The position determination unit 12 has a plurality of position determination means 22, such as a sonar device, an underwater navigation system (USBL), a GPS receiver, etc., for determining the actual position of the underwater device. A computer program is executed on the further control device 16, by means of which the position determination is controlled. In this regard, the control device 16 can process the data provided by the position determining means 22 for position determination.

As described above, the further control device 16 supports several technical functions of different components of the underwater device 1. In particular, the further control device 16 supports image processing in the image capture unit 13, display of an operating state on the screen display 20, and actual position determination in the position determination unit 12. In an alternative embodiment not shown, the image capture unit 13 and/or the position determination unit 12 and/or the display device 8 can each have their own control device.

FIG. 1 shows the data-transmitting communication between the components of the underwater device 1 with solid lines. Communication between the components of the underwater device 1 is handled using a communication protocol, in particular MQTT, which has a publish/subscribe mechanism.

A sensor value detected by a sensor 2 of the sensor device is published in a data channel not shown. The sensor value can be received by any receiving means, such as a receiving means of the image capture unit 13 not shown, that is subscribed to the data channel.

In addition, the sensor control device 15 can determine whether a sensor value detected by the sensor 2 of the sensor unit 14 deviates from a limit value or lies outside a limit range and thus a hazardous condition exists. Should this be the case, the sensor control device 15 can publish an alarm message in another data channel. Only the receiving means that have subscribed to the other data channel can receive the alarm message. Thus, the alarm message is not received to the image capture unit 13 that did not receive the other data channel. On the other hand, a receiving means of the control device 6 of the energy distribution unit 5, which is not shown, has subscribed to the other data channel so that the alarm message is transmitted to the energy distribution unit 5. Subsequently, the energy distribution unit 5 can disconnect the electrical connection between the energy source 4 and the electrical consumers in processing mode.

In FIG. 1, the electrical connections between the components of the underwater device 1 are shown as dashed lines. As can be seen in FIG. 1, the energy distribution unit 5 is electrically connected to several electrical consumers. Here, the display device 8, the image capture unit 13, the further control device 16, the switch 17, the sensor unit 14, and the position determination unit 12, in particular individual position determination means, each have at least one electrical consumer which has electronic components and can therefore be disconnected from the energy source 4 by means of the energy distribution unit 5.

The electrical energy source 4 has multiple batteries 23 and a battery control device 10 for controlling the batteries. The electrical energy source 4 is connected upstream of the energy distribution unit 5.

FIG. 2 shows the design of an energy distribution unit 5. As has already been described, the energy distribution unit 5 has the control device 6. Furthermore, the energy distribution unit 5 has one switching device 7 by means of which the electrical connection between the energy source 4 and the electrical consumer can be disconnected. For this purpose, the switching device 7 has a plurality of switches, not shown, by means of which the electrical connection to the respective electrical consumer can be disconnected. In particular, the switches can be used to disconnect the electrical connection of an electrical consumer separately and/or independently of other electrical consumers. In addition, a sensor 2 is shown in FIG. 2, by means of which the current of the respective electrical consumer is acquired. The detected current values are transmitted to the control device 6 and evaluated by the control device 6.

Provided that a hazardous condition has been determined by the control device 6 of the energy distribution unit 5 and/or by the sensor control device 15, the control device 6, when processing the alarm messages in the queue, causes the switching device 7, in particular the switch or switches of the switching device 7, to be switched in such a way that the electrical connection between the electrical energy source 4 and the electrical consumer or consumers is disconnected.

FIG. 3 shows a perspective view of the underwater device 1 from below. The underwater device 1 has a housing 11 which encloses a cavity, not shown. The electrical consumers and the energy distribution unit 5 are arranged in the cavity. The underwater device 1 has two openings on its underside. A first opening 18 is used to accommodate a sensor of the position determination unit, which is not shown. A second opening is closed by a transparent plate 19, such as a glass pane, and a housing receiving the transparent plate. The hyperspectral camera and the RGB camera can be placed inside the cavity in such a way that they can capture images of the seabed through the transparent plate 19.

The underwater device 1 also has two touchdown devices 25 projecting from the underside of the housing 11. The two, in particular rail-shaped, touchdown devices 25 run parallel to one another and are used to place the underwater device 1 on the seabed. In particular, the touchdown devices 25 can prevent the transparent plate 19 from coming into contact with the seabed.

The underwater device 1 has a recess for the electrical energy source 4 on one end face.

The electrical energy source 4 is connected in a releasable manner to the housing 11 in the recess. In particular, the energy source 4 is connected to the housing 11 in a form-fitting and/or force-fitting manner. The energy source 4 has multiple batteries not shown in the figures.

The underwater device 1 also has two handles 24 attached to the housing 11 and facing each other with respect to the housing 11, as shown in FIG. 4. The diver can easily manoeuvre and move the underwater device 1 by means of the handles 24.

FIG. 4 shows a top view of the underwater device 1. The underwater device 1 has the display device 8 on another end face. The display device 8 has a screen display 20. In addition, control buttons 21 are provided by means of which the underwater device 1 is operated. Furthermore, the underwater device 1 has an LED display 26 which shows the operating state of the underwater device 1. In particular, the LED display 26 and/or the screen display 20 can be used to indicate whether a hazardous condition exists.

LIST OF REFERENCE SIGNS

1 Underwater device
2 Sensor
4 Electrical energy source
5 Energy distribution unit 6 Control device
7 Switch
8 Display device
10 Battery control device
11 Housing
12 Position determination unit
13 Image capture unit
14 Sensor unit
15 Sensor control device
16 Further control device
17 Switch
18 First opening
19 Transparent plate
20 Screen display
21 Control buttons
22 Positioning means
23 Battery
24 Handle
25 Touchdown device
26 LED display
27 Data bus
28 USB line

The invention claimed is:

1. An underwater device for capturing images of a seabed, having a submersible housing, at least one sensor carried by the submersible housing for detecting a sensor value, at least one electrical consumer carried by the submersible housing, and an electrical energy source carried by the submersible housing for supplying the electrical consumer with electrical energy, characterised in that it is determined on the basis of the sensor value whether a hazardous condition is present for the electrical consumer, and an energy distribution unit is carried by the submersible housing which disconnects the electrical consumer from the electrical energy source if a hazardous condition is present.

2. The underwater device according to claim 1, characterised in that the energy distribution unit has a control device,
    a. which evaluates the acquired sensor value and/or
    b. which causes the electrical energy source to be disconnected from the electrical consumer if a hazardous condition exists and/or
    c. which causes no electrical energy to be supplied to the electrical consumer if a hazardous condition exists and/or
    d. which enables the supply of electrical energy to the electrical consumer.

3. The underwater device according to claim 2, characterised in that the energy distribution unit has a switching device by means of which the electrical connection between the electrical energy source and the electrical consumer can be disconnected.

4. The underwater device according to claim 3, characterised in that the energy distribution unit generates a switch-off message and the switch-off message is transmittable to the electrical consumer prior to disconnection of the electrical connection between the electrical energy source and the electrical consumer.

5. The underwater device according to claim 4, characterised in that
    a. the energy distribution unit waits for a predetermined period of time after the switch-off message has been transmitted before the electrical connection between the electrical energy source and the electrical consumer is disconnected and/or in that
    b. the energy distribution unit waits for feedback from the electrical consumer after transmitting the switch-off message before disconnecting the electrical connection between the electrical energy source and the electrical consumer and/or in that
    c. the energy distribution unit waits, after transmitting the switch-off message, until a current through the electrical consumer has fallen below a predefined threshold value before the electrical connection between the electrical energy source and the electrical consumer is disconnected.

6. The underwater device according to claim 2, characterised in that the control device of the energy distribution unit examines the acquired sensor value to determine whether a hazardous condition exists, and in that the energy distribution unit, in particular the control device, determines a hazardous condition if the acquired sensor value deviates from a predefined or predefinable limit value or lies outside a limit range.

7. The underwater device according to claim 2, characterised in that the control device of the energy distribution unit generates an alarm message when a hazardous condition exists.

8. The underwater device according to claim 1, characterised by an electrical display device carried by the submersible housing and by a control unit carried by the submersible housing which is electrically connected to the energy distribution unit.

9. The underwater device according to claim 6, characterised in that actuation of the control unit causes the energy distribution unit to selectively
    a. establish or disconnect the electrical connection between the electrical consumer and the electrical energy source or
    b. to switch the electrical consumer and/or the electrical display device into a sleep mode or
    c. to switch the electrical consumer and/or the electrical display device into an energy-saving mode.

10. The underwater device according to claim 8, characterised in that the energy distribution unit does not electrically disconnect the display device from the electrical energy source when a hazardous condition is detected.

11. The underwater device according to claim 1, characterised by a lighting device, in particular an LED display, for indicating an operating state of the underwater device.

12. The underwater device according to claim 1, characterised by a sensor unit that has the at least one sensor and a sensor control device, wherein the sensor control device determines that a hazardous condition exists when the detected sensor value deviates from a predefined or predefinable limit value or lies outside a limit range.

13. The underwater device according to claim 12, characterised in that the sensor control device is designed to publish an alarm message in a data channel when a hazardous condition exists, and the energy distribution unit is designed to receive the alarm message from the data channel and subsequently disconnect the electrical connection between the electrical consumer and the electrical energy source.

14. An underwater device for capturing images of a seabed, having at least one sensor for detecting a sensor value, at least one electrical consumer and an electrical energy source for supplying the electrical consumer with electrical energy;
    characterised in that it is determined on the basis of the sensor value whether a hazardous condition is present for the electrical consumer, and an energy distribution unit is present which disconnects the electrical consumer from the electrical energy source if a hazardous condition is present;

characterised in that the energy distribution unit has a control device:
  a. which evaluates the acquired sensor value and/or
  b. which causes the electrical energy source to be disconnected from the electrical consumer if a hazardous condition exists and/or
  c. which causes no electrical energy to be supplied to the electrical consumer if a hazardous condition exists and/or
  d. which enables the supply of electrical energy to the electrical consumer;

characterised in that the current supplied to the electrical consumer or the voltage applied to the electrical energy source or to the electrical consumer can be determined by means of the sensor, and further characterised in that:

a. the sensor detects the current supplied to the electrical consumer for a predetermined first period of time and for a predetermined second period of time which is longer than the first period of time, and in that the energy distribution unit uses the current values detected in the first period of time to determine whether the electrical consumer is disconnected from the electrical energy source and/or in that b. the control device of the energy distribution unit determines whether a hazardous condition exists based on the determined current value.

15. The underwater device according claim 1, characterised in that a temperature or a humidity or a pressure within a cavity of the underwater device can be determined by means of the sensor.

16. The underwater device according to claim 1, characterised by a position determination unit for determining the actual position of the underwater device, having an electrical consumer.

17. The underwater device according to claim 1, characterised by an image capture unit for capturing images of the seabed and having an electrical consumer, and further characterised in that
  a. the image capture unit has a hyperspectral camera for capturing images of the seabed and/or in that
  b. the image capture unit has a colour camera, in particular an RGB camera, for capturing images of the seabed.

18. The underwater device according to claim 1, characterised in that the underwater device maps the seabed based on the captured images.

19. The underwater device according to claim 1, characterised in that the underwater device is designed without a propeller.

20. The underwater device according to claim 1, characterised in that the underwater device is a diver-operated underwater device or an autonomous underwater vehicle or a cable-guided underwater vehicle.

* * * * *